Figure 1:
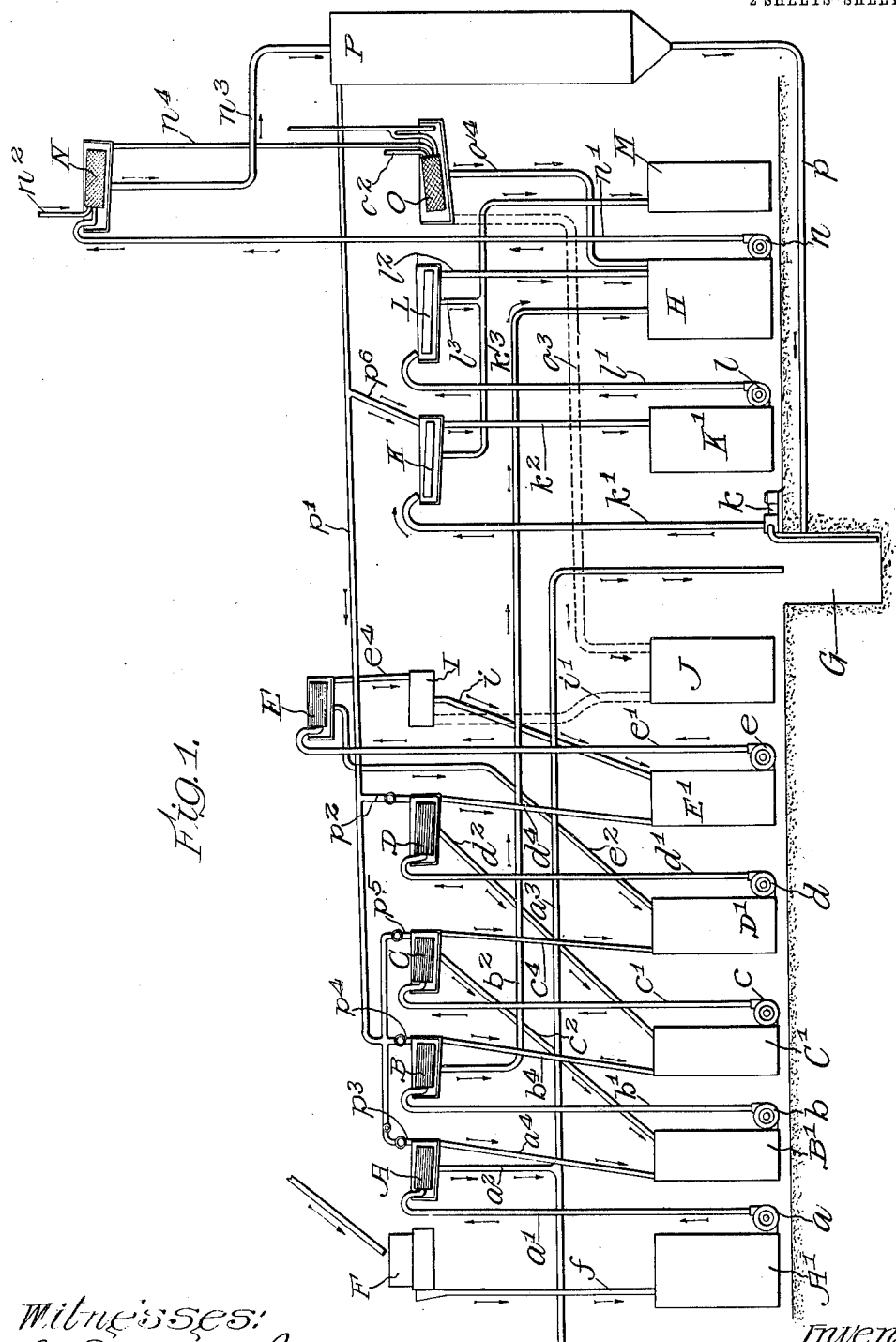

F. L. JEFFERIES.
PROCESS OF WASHING AND CONCENTRATING STARCH.
APPLICATION FILED FEB. 6, 1911.

1,007,784.

Patented Nov. 7, 1911.

2 SHEETS—SHEET 1.

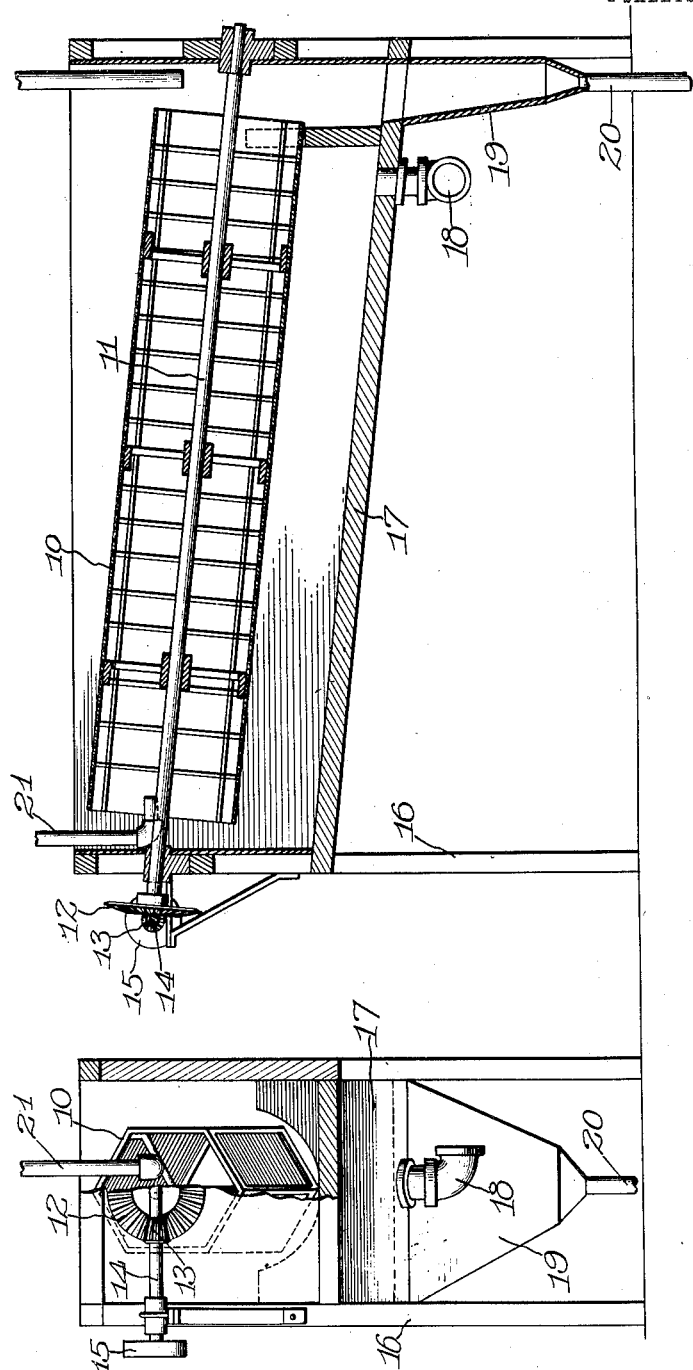

UNITED STATES PATENT OFFICE.

FREDRICK LESTER JEFFERIES, OF GRANITE CITY, ILLINOIS, ASSIGNOR TO CORN PRODUCTS REFINING COMPANY, A CORPORATION OF NEW JERSEY.

PROCESS OF WASHING AND CONCENTRATING STARCH.

1,007,784.      Specification of Letters Patent.      Patented Nov. 7, 1911.

Application filed February 6, 1911. Serial No. 606,895.

*To all whom it may concern:*

Be it known that I, FREDRICK L. JEFFERIES, a citizen of the United States, residing at Granite City, in the county of Madison and State of Illinois, have invented certain new and useful Improvements in Processes of Washing and Concentrating Starch, of which the following is a specification.

My invention relates to the manufacture of starch from corn and the invention has for its object to provide certain new and improved methods of separating the starch particles from the other constituents of the ground grain after the germ has been removed, and for concentrating the resultant starch liquor. According to the ordinary methods, which have been employed for a long time in starch factories, this separation is made by a simple process of washing and rewashing the ground grain on shaking sieves. Ordinarily the grain, after having been reground in bur mills following the removal of the germ, is first passed over a set of relatively coarse meshed shakers. These shakers are provided with a series of sprinklers and the material receives a series of washings first with the starch liquor and afterward with fresh water. The resultant liquors are divided according to densities, some of the lightest being used for washing again or mixing into the process at other stages, the more concentrated being passed over fine mesh shakers. The liquor from this set of shakers goes to the settling tanks, the solid matter is returned to the bur mills. Although this process has been, so far as I am aware, universally used for a very considerable period of time, it is a method which is open to series objections and consequently there have been many attempts made to devise improvements thereon, although, I believe, without any great degree of success up to the time of my present invention. One of the chief disadvantages in the system of washing above outlined is that the operation is not thoroughly done so that a good deal of starch adheres to the bran and so is wasted. Another disadvantage arises from the fact that most of the liquor resulting from the several washings is very dilute so that it has to be concentrated before it can be run to the starch table, this step being performed ordinarily in cone settlers and requiring a considerable period of time and consequently, in a factory of any considerable size a very large number of settlers. As an incident, the amount of water used up in the process is, of course, large and this, in some instances is an important item of manufacturing cost. Further, all the water taken out of the system contains a large amount of the dry substances of the corn and from this arises one of the principal wastes in the manufacture of starch.

The method here involved, which has been successfully employed on a large scale, improves upon the old method, first, by obtaining a thorough separation as between the starch and the other constituents of the grain, and, second, by effecting, simultaneously with the separation, a concentration of the resultant starch liquor which permits the elimination of the settling tanks or, at least, allows their size or number to be very considerably reduced. The amount of water required for the separation is also considerably decreased; and the loss of the dry substances of the corn is consequently reduced in proportion to the reduction in the amount of water.

To attain the above objects the process employs a series of screening elements, as they may be called, preferably rotary reels, although the process may be carried out with some advantage by means of the ordinary shakers or other sieves or screens; and instead of running the starch liquor from each of the separating operations direct to the cone settlers, as is done under the old method, the tailings from the first screening element are caused to pass successively through the rest of the units of the series; furthermore the liquid used in the several successive separating operations consists of bodies of starch liquor which are progressively lighter as the washing proceeds. That is, the fresh grain is washed by a relatively concentrated liquor, while clear water or a very light starch water is used for the last washing, the intermediate operations using bodies of starch liquor having proportionate densities between these two. Carrying out the process as I preferably do, these progressively lighter bodies of starch liquor with which any given portion of the ground grain is washed, are derived from washing operations performed on preceding portions of the material treated, but at stages of the washing operation which are subsequent with relation to their position in the series. In other words, the fresh liquor introduced into the system at the last washing operation of any given portion of the material, after being withdrawn from said portion in a more concentrated condition, is mixed with the portion of the material which has just been treated in the screening unit of the system next but one before the last, and this material so mixed with liquor is then put through a screening operation in the next unit of the series; and this is repeated at each stage of the washing so that the liquid first introduced in relatively dilute condition is eventually withdrawn from the system in concentrated condition and the grain is subjected to a series of washings with liquid which becomes clearer and clearer. The grain goes one way through the system, the liquid goes through in the other direction.

As above stated, the process may be carried out with some advantage by employing the ordinary bolting cloth shakers; but better results, all things considered, are obtained when the separations consist of a series of reeling operations taking place in rotary reels.

One of the objects of my invention is, in fact, to dispense with the shakers which are expensive to build, expensive to keep up, require a great deal of power to run because of their oscillatory movement, and which, for the same reason, cause rapid deterioration in the building in which they are located. It has been proposed to use reels, in one way or another in the making of this separation, but, so far as I am aware, no practical method has heretofore been devised for so using them.

The application of the general principles above set forth to the practical handling of the material in a starch factory is shown in the accompanying drawings, wherein—

Figure 1 is a diagrammatic view illustrating an arrangement for carrying out the process in its preferred form; Fig. 2, an end view of a reel suitably constructed for use in this connection, and Fig. 3, a longitudinal sectional view of the same.

Like characters of reference indicate like parts in the several figures of the drawings.

Referring first to Figs. 2 and 3, 10 designates a preferably hexagonal reel rigidly mounted on an obliquely arranged shaft 11 driven in any suitable manner, for example, by means of the bevel gear 12 thereon meshed by a bevel gear 13 on a shaft 14 carrying the belt pulley 15. 16 designates the supporting framework of the reel which supports likewise a trough 17 having, at its lower end, the starch liquor discharge pipe 18. The tailings from the reel are discharged into a hopper 19 from which leads a pipe 20. The material to be separated, ground grain and liquid, enters the reel through a pipe 21 at its upper end. It will be understood that the particular construction of the reel forms no part of my present invention. The reel construction and, generally speaking, the apparatus employed for carrying out the process here concerned, are described and claimed in a co-pending application Serial No. 606,896, filed February 6, 1911.

Referring now to Fig. 1, A, B, C, D and E designate five reels, of the sort above described. A larger number of units might obviously be employed and, furthermore, each unit might consist of the several reels operated in parallel instead of the single reels shown. The particular installation which I have in mind in describing the process employs three reels at A, three at B, two at C, one at D, and two at E. In describing the other instrumentalities used in carrying out the process it will be understood that there might be a similar multiplication and operation in parallel. F designates a bur mill in which the grain is ground. A' is a tub which receives the ground grain from the mill F through pipe $f$, and B', C', D' and E', change tubs which receive the tailings from, respectively, reels A, B, C and D. A pump $a$ and pipe $a'$ take the material in tub A' and deliver it to reel A. A pipe $a^2$ conducts the starch liquor from the reel A. This pipe, as shown, connects with a pipe $a^3$ which leads to the heavy starch well G. The tailings from reel A go through a pipe $a^4$ to the tub B'. The subsequent reels and change tubs have similar connections, which have been correspondingly designated on the drawings, except that, in the particular installation shown, the starch liquor discharge pipe $b^2$ from reel B leads to a light starch liquor tub H, the starch liquor discharge pipes $c^2$, $d^2$, $e^2$, leading back into, respectively, change tubs B', C' and D', while the tailings discharge pipe $e^4$ from reel E leads to an expeller I. The liquid from the expeller I is shown as returned to the system through a pipe $i$ which leads to tub E'. The bran from the expeller is carried, by means of a suitable conveyer $i'$, to the feed repository J shown conventionally in the drawing. In the installation above described, reels A, B, C, D, E, are relatively coarse copper reels. As a result, some gluten or other foreign matter may be found in the starch liquor which reaches the heavy starch well G. Preferably, therefore, I rewash this liquor, and this operation may be performed upon the fine mesh shakers K and L, of ordinary construction, although reels might be also effectively used at this point in the process. The liquor in the starch well is carried by means of pump $k$ and pipe $k'$ to shaker K, the tailings from which pass through a pipe $k^2$ to the tub K' from which they are taken by pump $l$ and pipe $l'$ to the second shaker L, the tailings from which go through a pipe $l^2$ into the light starch water tub H. The starch liquor from shaker K is conducted by a pipe $k^3$ and that from shaker L by a pipe $l^3$ to the starch tables which are represented conventionally at M. The starch liquor from reel B has been described as going to the light starch water tub H. In order to remove the gluten and other foreign particles from this liquid, it is put through a separating operation, for example, in two silk reels (similar to the reels A, B, C, D and E except that the screens are of silk instead of copper mesh), these reels being designated N and O. A pump $n$ and pipe $n'$ takes the starch water from the tub H to reel N where it is mixed with a fresh wash water, for example sulfur water, introduced through a pipe $n^2$. The starch water from N passes through a pipe $n^3$ into a cone settler P. The tailings from reel N pass through a pipe $n^4$ into the second silk reel O which is supplied with fresh wash water, for example sulfur water, through a pipe $o^2$. The tailings from reel O pass by means of a conveyer $o^3$ to the feed repository J. The starch liquor from O goes through a pipe $o^4$ to the light starch water tub H. The heavy starch liquor from settler P goes through a pipe $p$ to the starch well G. The overflow from the top of settler P passes through a pipe $p'$ which has a valved branch $p^2$ leading to change tub E' through the tailings spout of reel D. Preferably also the pipe $p'$ has the valved branches $p^3$, $p^4$, $p^5$, leading, respectively, to the tailings spouts of reels A, B and C. Tub E' may thus receive a portion of its supply of fresh wash water from settler P. Enough water is introduced into the tailings spouts of reels A, B and C through the pipes $p^3$, $p^4$, $p^5$ to carry the tailings through pipes $a^4$, $b^4$, $c^4$. Similarly water from pipe $p$ is led through pipe $p^6$ to the tailings spout of shaker K.

While I have shown a practical system involving a certain particular disposition of the material derived from the various stages of the process, it will be readily understood that there might be a very considerable change in these details which are of themselves of little importance.

Having in mind the above description of the apparatus employed, the process is carried out as follows: The grain which has been first broken up and the germ removed is ground in the bur mill F and then goes to tub A'. It is mixed with liquid in the mill and more water may be supplied if necessary when it reaches A'. From tub A' it goes to reel A and if the resultant starch liquor derived is sufficiently concentrate (and this is contemplated by the arrangement shown and described) it is simply subjected to a rewashing in shakers K and L and then is ready for the starch tables. The principal feature of the process, namely, the moving of the ground material in one way through a succession of screening operations and the carrying of the resultant starch liquor contrariwise, commences when the tailings from A are rewashed in reel B. Before going to B the tailings from A enter the change tub B' where they are mixed with the starch liquor derived from the preceding separation taking place in reel C. Similarly the tailings from B are mixed with starch water from D before being treated in reel C. A final washing takes place in E with the fresh water, which may, of course, be light starch water, taken from the change tub E'. The concentrated starch liquor is withdrawn from the reel B, rewashed successively in the silk reels N, O, and then further concentrated in the settler P. It will be possible to carry out the process by eliminating the settler and running the starch liquor taken from B into tub A' and thence to the reel A and through the system as above described.

I claim:

1. The process of separating starch from other constituents of the grain which comprises reducing the grain to a finely divided form and subjecting it, mixed with a liquid, to a succession of separating operations in rotary reels in which the tailings are washed by starch liquor obtained from the operations next precedent in time but next subsequent relative to the series of operations on any given portion of the material treated.

2. The process of separating starch from other constituents of the grain which comprises reducing the grain to a finely divided form and subjecting it in successive bodies, mixed with a liquid, to a series of separating operations in rotary reels in which the fresh liquid is introduced into the process at the last separating operation of the series, with respect to any given body of the material, and is used progressively in separating operations in which bodies of successively fresher material are treated, and finally withdrawing the liquid as a concentrated starch liquor from a separating operation in which a body of fresh material is treated.

3. The process of separating starch from other constituents of the grain which comprises reducing the grain to a finely divided form and subjecting it in successive bodies, mixed with a liquid, to a series of separating operations in rotary reels in which the fresh liquid is introduced into the process at the last separating operation of the series, with respect to any given body of the material, and is used progressively in separating operations in which bodies of successively fresher material are treated, and finally withdrawing the liquid as a concentrated starch liquor from a separating operation in which a body of fresh material is treated, and thereupon subjecting such starch liquor to a closer separating operation to remove the smaller particles of foreign matter.

4. The process of separating starch from other constituents of the grain which comprises reducing the grain to a finely divided form and subjecting it, mixed with a liquid, to a succession of screening operations in which fresh washing liquid is introduced in the system at the last operation of the series and is used on material which is successively fresher, withdrawing the liquor from the system when it has become concentrate, then subjecting the resultant starch liquor to a closer screening operation so as to remove the smaller particles of foreign matter.

5. The process of separating starch from other constituents of the grain which comprises reducing the grain to a finely divided form, mixing it with a liquid, and putting it through a preliminary separating operation, taking the tailings from this operation and subjecting them, mixed with a liquid, to a plurality of screening operations in which the tailings are washed successively by progressively lighter bodies of starch liquor which are successively used on fresher bodies of the grain so as to become more and more concentrated.

6. The process of separating starch from other constituents of the grain which comprises reducing the grain to a finely divided form, mixing it with a liquid, putting it through a preliminary separating operation, taking the tailings from this operation and subjecting them, mixed with a liquid, to a plurality of screening operations in which the tailings are washed successively by progressively lighter bodies of starch liquor which are successively used on fresher bodies of the grain so as to become more and more concentrated, and subjecting the starch liquor from the preliminary separation to a closer separating operation to remove the smaller particles of foreign matter.

7. The process of separating starch from other constituents of the grain which comprises reducing the grain to a finely divided form, mixing it with a liquid, putting it through a preliminary separating operation, taking the tailings from this operation and subjecting them, mixed with a liquid, to a plurality of screening operations in which the tailings are washed successively by progressively lighter bodies of starch liquor which are successively used on fresher bodies of the grain so as to become more and more concentrated, and subjecting the starch liquor, resulting from the preliminary separation and from the successive washings, to a closer separation in order to remove the smaller particles of foreign matter.

8. The process of separating starch from other constituents of the grain which comprises reducing the grain to a finely divided form and subjecting it, mixed with a liquid, to a series of separating operations in rotary reels in which the tailings from one operation are first mixed with the starch liquor derived from an operation precedent in time but subsequent relative to the series of operations repeated on any given portion of the material, and after being so mixed are run to the next succeeding screening operation.

9. The process of separating starch from other constituents of the grain which comprises reducing the grain to a finely divided form and subjecting it, mixed with a liquid, to a succession of separating operations in rotary reels in which the tailings of said successive separations are washed by progressively lighter starch liquor.

10. The process of separating starch from other constituents of the grain which comprises reducing the grain to a finely divided form and subjecting it, mixed with a liquid, to separating operations in rotary reels in which the liquid employed is caused to be used successively in a plurality of said operations so as to become a concentrated starch liquor when taken out of the system.

11. The process of separating starch from other constituents of the grain which comprises reducing the grain to a finely divided form and subjecting it, mixed with a liquid, to a plurality of separating operations in rotary reels in which the tailings are washed successively by progressively lighter bodies of starch liquor which bodies of liquor are successively used on progressively fresher bodies of the grain.

FREDRICK LESTER JEFFERIES.

Witnesses:
F. M. SAYRE,
A. N. HOMAN.